United States Patent [19]

Cobb et al.

[11] 3,899,646

[45] Aug. 12, 1975

[54] TELEPHONE SET SPEECH NETWORK

[75] Inventors: Douglas Romain Cobb, Dunwoody, Ga.; Roger Edward Holtz, Indianapolis, Ind.; David Carlaw Trimble, Holmdel, N.J.

[73] Assignee: Bell Telephone Laboratories, Incorporated, Murray Hill, N.J.

[22] Filed: May 28, 1974

[21] Appl. No.: 473,792

[52] U.S. Cl. .......................... 179/170 NC; 179/81 R

[51] Int. Cl.² .......................... H04B 1/52

[58] Field of Search ........... 179/170.2, 170.6, 170.8, 179/81 R, 81 A, 81 B, 170 NC, 170.2, 170.6, 170.8

[56] References Cited

UNITED STATES PATENTS

| | | | |
|---|---|---|---|
| 3,529,099 | 9/1970 | Ribner | 179/81 R |
| 3,546,395 | 12/1970 | Schuh | 179/81 A |
| 3,602,648 | 8/1971 | Holtz et al. | 179/81 A |
| 3,708,630 | 1/1973 | Matsuda et al. | 179/81 A |
| 3,745,261 | 7/1973 | Friedman | 179/170.6 |

*Primary Examiner*—Kathleen H. Claffy
*Assistant Examiner*—Randall P. Myers
*Attorney, Agent, or Firm*—A. D. Hooper

[57] ABSTRACT

A speech network for performing both the hybrid and d-c line voltage regulation functions includes a high gain voltage controlled current source with feedback for compensating for the shunting effect of relatively low impedance d-c power supply circuits across the line. The network can be fabricated by integrated circuit techniques.

18 Claims, 5 Drawing Figures

TELEPHONE SET SPEECH NETWORK

BACKGROUND OF THE INVENTION

1. Field of the Invention

This invention relates to speech networks for telephone sets and more particularly to a speech network utilizing a noninductive hybrid circuit.

2. Description of the Prior Art

Because of the large bulk and weight of the inductive or transformer hybrids presently used in most telephone speech networks, various attempts have been made to eliminate such hybrids. The elimination of these hybrids makes the resulting networks adaptable to manufacture by integrated circuit techniques with the resulting opportunities for improving the performances and flexibility of the networks.

The results from previous attempts at providing integrable electronic networks have not been completely satisfactory. For example, these previous networks have been inefficient in the use of available power and often require operating voltages larger than that available from the line for the specific network impedances required by the telephone system. Further, some of these previous networks do not provide for a power supply output which is sufficiently isolated from the line and thus which loads the line unacceptably.

Still another problem with previously proposed electronic speech networks is the relative complexity thereof because of the use of separate circuits or networks for performing the hybrid functions and the d-c line regulation functions.

Accordingly, it is a broad object of this invention to improve telephone speech networks.

A more specific object is to provide an integrable speech network for telephone sets.

Another object is to provide a speech network with a noninductive hybrid.

Another object is to reduce the complexity of electronic speech networks.

A still further object is to improve the efficiency of speech networks in the use of available power.

Another object is to provide a speech network which can accommodate a power supply circuit that would otherwise present an unacceptably low or varying shunt impedance to the speech network and line, and whose output voltage can be a substantial fraction of the available voltage on the line.

SUMMARY OF THE INVENTION

The foregoing objects and others are achieved in accordance with this invention by a speech network which performs both the hybrid and d-c line voltage regulation functions. The network includes a high gain voltage controlled current source with feedback which also provides transmit gain and compensation for the shunting effect of a relatively low impedance power supply circuit across the line. Accordingly, a power supply circuit which provides sufficient output power at the relatively low available line voltages can be used. The network contains only elements which can be formed by integrated circuit techniques.

BRIEF DESCRIPTION OF THE DRAWING

The invention will be more fully comprehended from the following detailed description and accompanying drawing in which.

DETAILED DESCRIPTION

Figure 1:
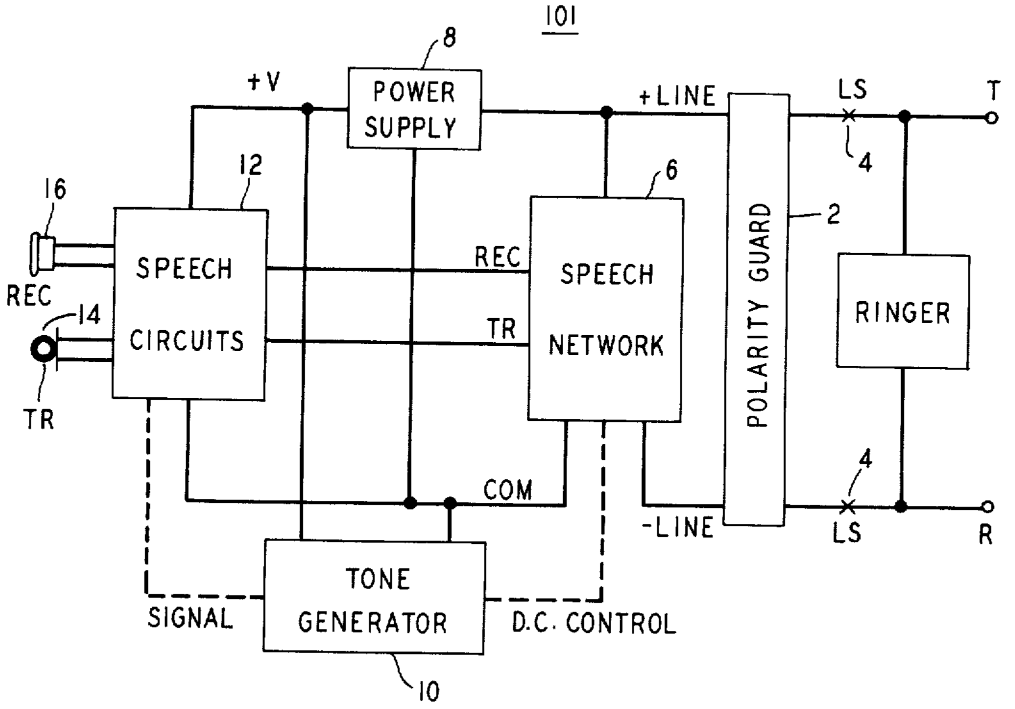
FIG. 1 is a block diagram of a telephone set utilizing the speech network of this invention.

FIG. 1 shows in block diagram form a telephone set 101 employing an electronic hybrid-regulator or speech network 6 in accordance with this invention. The set includes a polarity guard 2 for connecting the set to the lines T and R from the central office when the line switch LS contacts 4 are closed. Polarity guard 2 can comprise a diode network or similar apparatus well known in the art for insuring that the same polarity is always maintained across the speech network 6. A speech network 6 in accordance with this invention performs the standard a-c hybrid functions of separation of transmit and receive signals (i.e., two wire-four wire conversion or sidetone cancellation), determines the a-c input impedance of the set, regulates the d-c characteristics of the set, and provides for a power supply circuit as will be discussed in detail subsequently.

Power supply circuit 8 under the control or regulation of speech network 6 draws d-c power from the telephone line, filters out the a-c signal, and makes d-c available for the operation of speech circuits 12, tone generator 10, or other circuits of set 101. Speech circuits 12 may comprise amplifiers, equalizers, limiters or shaping networks required by transmitter 14 and receiver 16. These speech circuits 12 as well as transmitter 14, receiver 16 and tone generator 10 can comprise apparatus well known in the art.

Figure 3:
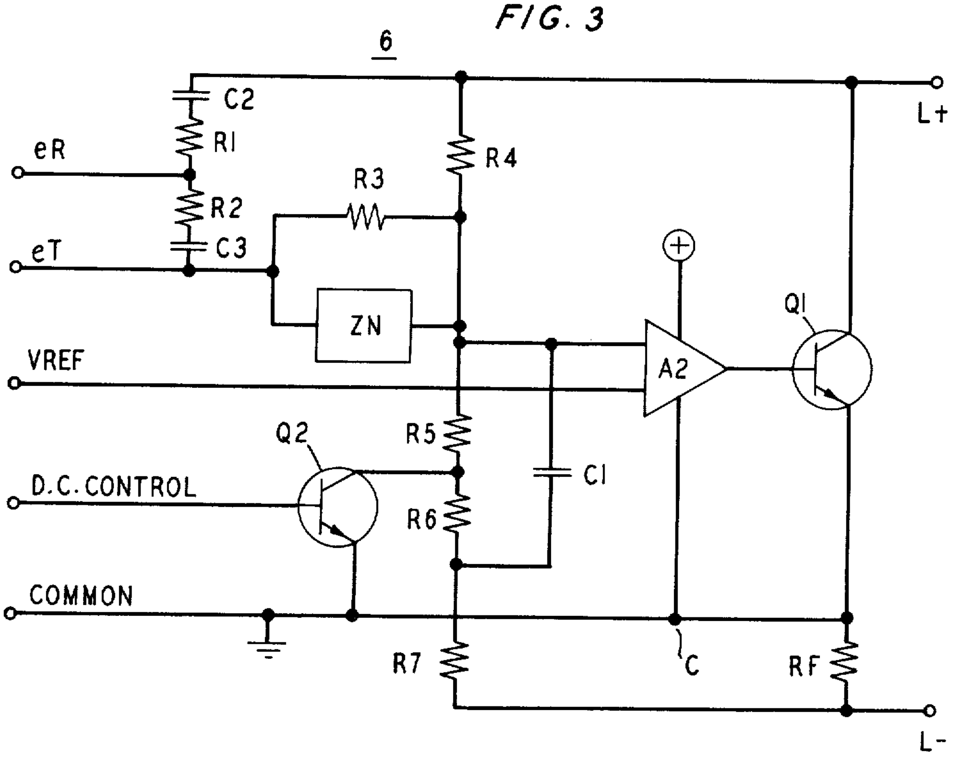
FIG. 3 is a more detailed schematic block diagram of the network of FIG. 2.
Figure 2:
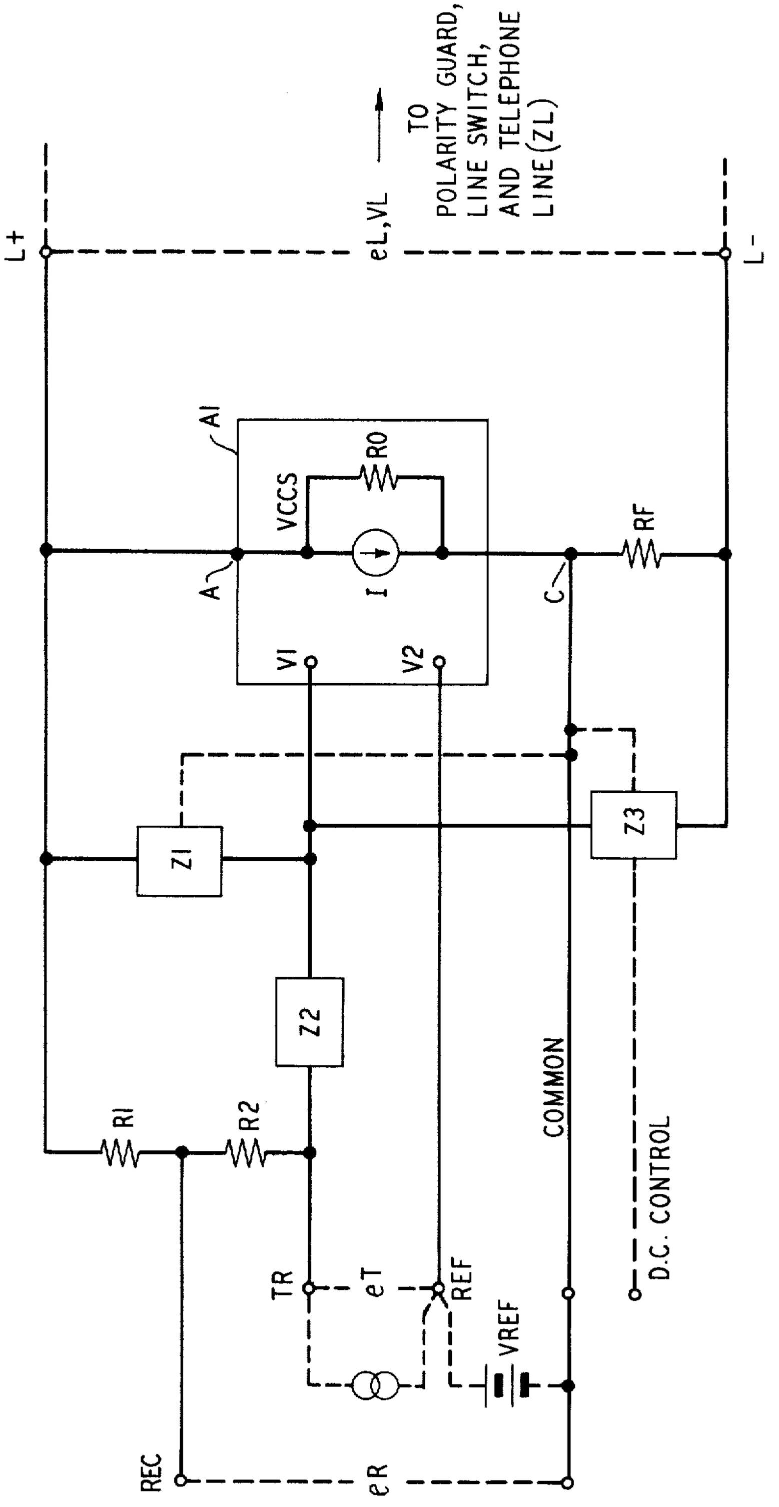
FIG. 2 is a combined schematic block diagram representation of the speech network.

As shown in FIG. 2, to simultaneously satisfy the a-c and d-c performance requirements of the speech network 6, a high gain voltage controlled current source (VCCS) A1 is utilized, along with feedback networks RF, Z1 and Z3, input network Z2, and a voltage dividing network comprised of resistors R1 and R2. Current source A1, with positive and negative inputs V1 and V2, respectively, and output between terminals A and C, can comprise a differential input operational amplifier A2 followed by a common emitter transistor Q1 which serves as the current source as shown in FIG. 3. The generated current is given by:

$$I = gm\ (V1 - V2), \tag{1}$$

where current flowing from terminal A to terminal C is considered in the positive sense, gm is the transconductance of source A1 and V1 and V2 are the magnitudes of the voltages at inputs V1 and V2, respectively. The output impedance of source A1 is represented by Ro and the strength by gm. Networks Z1 and Z3 may, in general, be (three terminal) two-port networks known in the art with connections also to a third point such as terminal C in the diagram as shown in phantom.

A source VREF of reference voltage is supplied to one input of source A1. The transmit signal eT referenced to terminal REF of source VREF, is introduced into the network at terminal TR, the junction of resistor R2 and network Z2. Input network Z2 contains a sidetone balancing impedance ZN shown in FIG. 3 which is designed to be proportional to the telephone line impedance ZL. A feedback resistor RF is placed between terminal C and the negative line terminal L−. Feedback resistor RF is small, for example 20 ohms, in order to minimize loss of d-c power and a-c signals. Consequently, the a-c signal eL between line terminals L+ and L− is essentially the same as that between terminal L+ and circuit common COM which connects to terminal C.

In transmitting, the speech network 6 generates an a-c component of line voltage eL between terminal L+ and common COM, which is proportional in magnitude to the transmit signal eT and out of phase therewith by 180°.

In receiving, with no transmit signal, the line voltage eL appears across the voltage divider formed by resistors R1 and R2 between terminals L+ and TR, and a fraction of the line voltage eL given by R2/(R1 + R2) appears at the receiver terminal REC, referenced to common COM, as the receive signal. Sidetone cancellation occurs in the voltage divider formed by resistors R1 and R2 which sums the transmit signal eT and the line voltage eL. When the resistors R1 and R2 are scaled in the proportion of the transmit input voltage and the transmit line voltage, and the line voltage is shifted in phase by 180 degrees as previously described, then the terminal REC is a null point for transmit signals, but delivers a fraction of the receive signal.

When source A1 is high gain, input terminal V1 becomes a virtual ground, and the operation of the circuit can then be easily approximated. The input impedance of speech network 6 between line terminals L+ and L− is given by:

$$Zin = \frac{RF\,Z1}{Z3} \qquad (2)$$

where Z1 and Z3 are the transfer impedances of networks Z1 and Z3 and RF is the resistance of resistor RF. The transmit gain AT through the speech network 6 is given by:

$$AT = \frac{-Z3}{RF\,Z2}\;\frac{(ZL\,Zin)}{(ZL + Zin)} \qquad (3)$$

where ZL is the a-c load impedance presented to the telephone speech network 6 by the line, Zin is the input impedance as defined above, Z2 is the transfer impedance of network Z2, and the minus sign indicates a 180 degree phase shift. If network Z3 is resistive, then impedance Z2 must be proportional to:

$$ZL\,Zin/(ZL + Zin). \qquad (4)$$

That is, Z2 is proportional to the line impedance ZL in parallel with the speech network input impedance Zin in order to keep the transmit gain at 180° phase shift and allow sidetone cancellation in resistors R1 and R2 as previously described. Impedance Z2 will then be a resistance in parallel with a sidetone balancing impedance ZN which is proportional to the line impedance ZL. The receive gain through the speech network is given by:

$$AR = R2/(R1 + R2), \qquad (5)$$

where R1 and R2 are the values of the indicated resistors.

Network ZN can comprise a resistive-capacitive network well known in the art. The impedance of network ZN is designed to be a multiple of the transmission line impedance or load ZL. For example, in a typical case the impedance of ZN is designed to be equivalent to a multiple of 15,000 feet of 26 gauge cable terminated by 900 ohms.

The d-c characteristics of speech network 6 are determined by source A1, the d-c impedances of networks Z1 and Z3, resistance of resistor RF, and the reference voltage source VREF. The d-c component of line voltage is given by:

$$VL = \frac{Z1R + Z3R}{Z3R}(VREF + RFIL), \qquad (6)$$

where IL is the d-c line current, Z1R and Z3R represent the d-c resistance of networks Z1 and Z3, respectively, VREF represents the magnitude of source VREF and RF is the value of resistor RF. An equivalent circuit for this d-c characteristic is a resistance of value $$\frac{(Z1R + Z3R)}{Z3R}\,RF$$

in series with a d-c voltage of value $$\frac{(Z1R + Z3R)}{(Z3R)}\,VREF.$$

As previously mentioned and shown in FIG. 3, source A1 is realized as operational amplifier A2 and output transistor Q1. Resistor R4 comprises impedance network Z1 of FIG. 2. Impedance network Z3 of FIG. 2 is comprised of resistors R5, R6, and R7 and capacitor C1. Transistor Q2 acts as a switch to modify the d-c characteristics of this network. Impedance Z2 of FIG. 2 comprises balancing network ZN in parallel with resistor R3. Voltage divider resistors R1 and R2 are coupled by capacitors C2 and C3.

Multifrequency signalling such as TOUCH-TONE dialing requires a d-c voltage across set 101 which is incompatible with the normal speech functions of speech network 6. Accordingly, during such dialing, the d-c characteristics of network 6 are changed to provide the higher voltage levels required. This is accomplished by feeding a control signal from tone generator 10, used in signalling or dialing, to the base of transistor Q2 to turn on this transistor and thereby change the d-c impedance of network 6. This change in d-c impedance provides the higher voltages needed for signalling. When the control signal from tone generator 10 is removed from the base of transistor Q2, the transistor reverts to its inactive state and thus speech network or hybrid-regulator 6 returns to its speech configuration.

Figure 4:
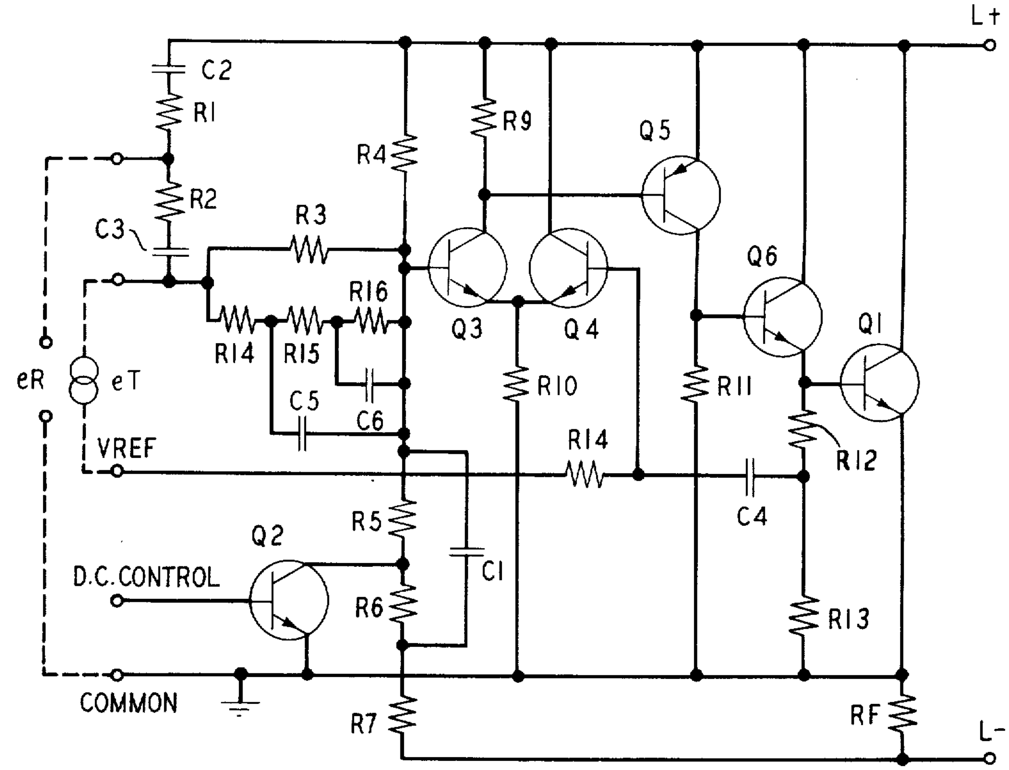
FIG. 4 is a more detailed schematic of the network of FIG. 3.

A more detailed schematic of one embodiment of hybrid-regulator 6 is shown in FIG. 4. In this embodiment, operational amplifier A2 includes a differential arrangement of transistors Q3 and Q4 and output transistors Q5 and Q6 along with conventional biasing and load resistors. Sidetone balancing network ZN is shown as a resistive-capacitive network comprising resistors R14, R15 and R16 and capacitors C5 and C6.

The d-c power and voltage available to speech network 6 at line terminals L+ and L− is normally quite low. For example, a common requirement on telephone sets in use today is that such sets must present a d-c impedance of 200 ohms or less to the line at a current of twenty milliamps and above in order to draw sufficient current from the line. This requirement corresponds to values of four volts d-c at 20 milliamps available from the line. These four volts are not all available at the terminals L+ and L− of speech network 6 however. Approximately 0.85 volts will be dissipated in polarity guard 2 and a surge protector which is not shown. The amplifiers in set 101 will operate on voltages as low as 2.5 volts if sufficient power is supplied. Thus very efficient use must be made of the available d-c power and voltage. The power supply utilized must also isolate the remainder of the circuit from voltage fluctuations or swings on the line and provide a relatively ripple-free d-c voltage to the amplifiers. Power supplies utilizing active circuits provide good isolation but cannot be utilized because the line voltage required for such supplies is greater than the four volts present.

Figure 5:
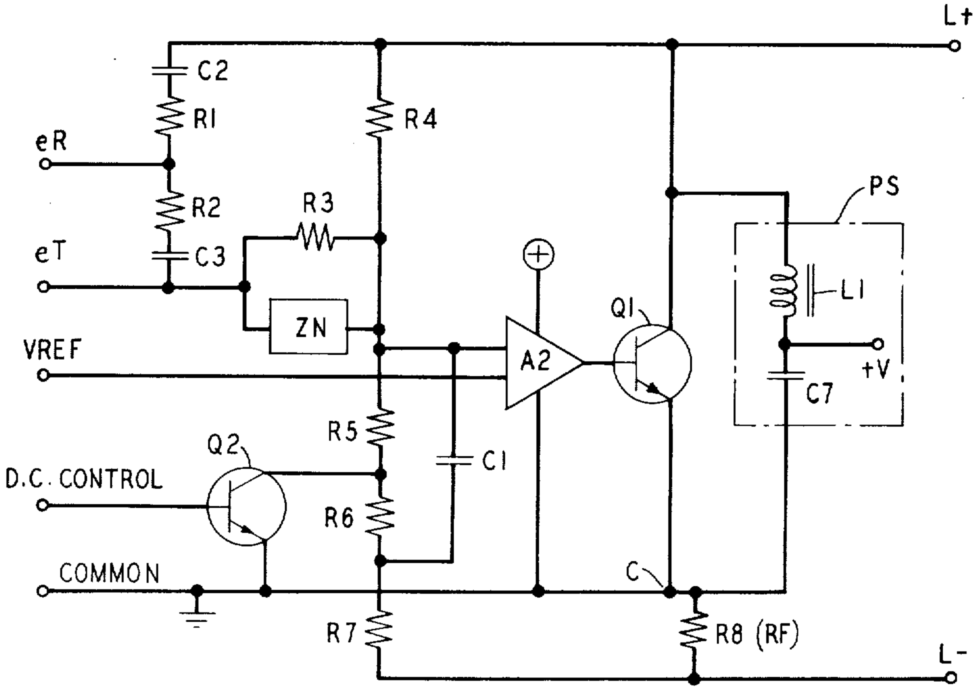
FIG. 5 is a schematic of a speech network and a power supply which can be used therewith.

The speech network 6 of this invention provides the needed flexibility in the selection of the proper type of power supply for obtaining the power from the line and making efficient use thereof at the available low voltages as will now be shown. A feature of network 6 is that the use of high gain amplifier A2 with feedback allows the use of power supply circuits such as a passive series inductor shunt capacitor power supply circuit which could not otherwise be used because of its loading or shunting effect across the line. For example, as shown in FIG. 5, a power supply circuit PS comprising an inductor L1 and a capacitor C7 is connected between line terminal L+ and the common terminal C. The parameters of inductor L1 are chosen so that the inductor L1 presents an impedance shunt to the line of approximately 1000 ohms, e.g. 150 millihenries at 5 milliamps, with a resistance of 100 ohms or less. Thus the power supply circuit PS requires only approximately 0.1 volt per milliamp of current supplied. All current through power supply PS must also flow through resistor R8. Because of feedback through resistors R5, R6, and R7 and capacitor C1, as previously discussed, the total current through resistor R8 will be controlled whether it comes from the emitter electrode of transistor Q1, which is the output of a current source, or from power supply PS or any other source. Thus stray currents through power supply PS are cleaned up by amplifier A2 with feedback and the effect of the shunt impedance of power supply circuit PS is compensated. Resistor R8 should be relatively small as indicated earlier in order to save d-c voltage. The combination of all the circuitry across the line including the power supply circuit PS and hybrid-regulator 6 appears as a fixed input impedance within the range previously mentioned as being required for the set.

Combining the hybrid and d-c regulation functions into a single circuit or network as proposed by this invention results in a substantial simplification in the circuitry required in telephone sets utilizing active speech networks. The resulting combined speech network includes only easily realizable components. The network can be fabricated by known integrated circuit techniques if desired to obtain a substantial space savings and other benefits.

The speech network performs the normal transmit, receive and sidetone functions at a low enough line voltage to allow use of a polarity guard and still meet the resistance requirement of 200 ohms commonly imposed on telephone sets. The network provides compensation for a relatively low impedance power supply circuit which would otherwise unacceptably load the line. Thus a power supply output of acceptable voltage and power can be provided from the relatively low line voltage available. Further, the input impedance remains fixed despite changes on the line. The network provides transmit gain so that high signal swings occur only at the line terminals.

While the invention has been described with reference to specific embodiments thereof, it is to be understood that various modifications might be made thereto without departing from its spirit and scope. For example, the illustrated voltage controlled current source could be replaced by another controlled source such as a current controlled current source.

What is claimed is:

1. A speech network for a telephone set comprising first and second telephone line terminals, a common terminal, a reference terminal, a third transmit terminal and a fourth receive terminal, CHARACTERIZED IN THAT said network includes:
   - a current source connected between said first line terminal and said common terminal, said current source having first and second control inputs with said second control input connected to said reference terminal;
   - a first impedance network connected between said first line terminal and said first control input;
   - a second impedance network connected between said third terminal and said first control input;
   - a third impedance network connected between said second line terminal and said first control input;
   - a first impedance element connected between said common terminal and said second line terminal; and
   - means for combining signals appearing at said third transmit terminal with signals appearing at said first line terminal for producing a signal at said fourth receive terminal.

2. Apparatus in accordance with claim 1 wherein said first impedance network comprises a resistor.

3. Apparatus in accordance with claim 1 wherein said speech network is adapted for connection to a telephone line having an input impedance and said second impedance network comprises:
   - a sidetone balancing network having an impedance proportional to said input impedance of said telephone line; and
   - a second impedance element in parallel with said sidetone balancing network.

4. Apparatus in accordance with claim 3 wherein:
   - said sidetone balancing network comprises first, second and third resistors connected in series between said third transmit terminal and said first control input, a first capacitor connected in parallel with said second and third resistors; and a second capacitor connected in parallel with said third resistor; and said second impedance element comprises a fourth resistor.

5. Apparatus in accordance with claim 1 wherein said first impedance element comprises a resistor.

6. Apparatus in accordance with claim 1 wherein said third impedance network includes first, second and third resistors connected in series between said first control input and said second line terminal, and a capacitor connected in parallel with said first and second resistors.

7. Apparatus in accordance with claim 6 including a transistor having base, emitter, and collector electrodes with said collector electrode connected between said first and second resistors and said emitter electrode connected to said common terminal, said base electrode being adapted for receiving a control signal input whereby said transistor can be activated by said control signal input to change said third impedance network.

8. Apparatus in accordance with claim 1 wherein said combining means comprises:

first impedance means connected between said first line terminal and said fourth receive terminal; and second impedance means connected between said third transmit terminal and said fourth receive terminal; whereby sidetone signals between said third and fourth terminals are canceled.

9. Apparatus in accordance with claim 8 wherein said first and second impedance means each comprises a resistor.

10. Apparatus in accordance with claim 1 wherein said current source comprises:

a first transistor having base, emitter, and collector electrodes with said collector and emitter electrodes connected to said first line terminal and said common terminal, respectively; and a differential input amplifier having its output connected to said base electrode of said first transistor and having said first and second control inputs.

11. Apparatus in accordance with claim 10 wherein said differential input amplifier comprises third, fourth, fifth and sixth transistors each having base, emitter and collector electrodes;

said third and fourth transistors having said emitter electrodes connected with each other;

said collector electrode of said third transistor being connected to said base electrode of said fifth transistor;

said collector electrode of said fifth transistor being connected to said base electrode of said sixth transistor;

first means connecting said emitter electrode of said sixth transistor to said base electrode of said fourth transistor;

second means for biasing said third, fourth, fifth and sixth transistors; and said first control input and said output of said amplifier comprise said base electrode of said third transistor and said emitter electrode of said sixth transistor, respectively.

12. Apparatus in accordance with claim 11 including:

first and second resistors connected from said fourth receive terminal to said first line terminal and said third transmit terminal, respectively;

a power supply connected between said first line terminal said said common terminal; and wherein said first impedance network comprises a resistor;

said second impedance network comprises a sidetone balancing network with a third resistor in parallel therewith;

said third impedance network comprises a plurality of resistors, a first capacitor in parallel with selected ones of said plurality of resistors, and a second transistor responsive to a control signal input for changing the impedance of said third network; and said first impedance element comprises a fourth resistor.

13. Apparatus in accordance with claim 12 wherein:

said power supply comprises an inductor and a second capacitor; and said sidetone balancing network comprises a network of resistors and capacitors.

14. Apparatus in accordance with claim 1 including a power supply connected between said first line terminal and said common terminal.

15. Apparatus in accordance with claim 14 wherein said power supply comprises an inductor and a capacitor.

16. An electronic telephone set comprising a speech network for providing hybrid and line voltage regulation functions, transmitter means, and receiver means, said network including first and second line terminals, a common terminal, a reference terminal, a receiver terminal and a transmitter terminal CHARACTERIZED IN THAT said network further includes:

a current source connected between said first line terminal and said common terminal, said current source having first and second control inputs with said second control input connected to said reference terminal;

a first impedance network connected between said first line terminal and said first control input;

a second impedance network connected between said transmitter terminal and said first control input;

a third impedance network connected between said second line terminal and said first control input;

a first impedance element connected between said common terminal and said second line terminal; and means for combining signals appearing at said transmitter terminal with signals appearing at said first line terminal for producing a signal at said receiver terminal.

17. Apparatus in accordance with claim 16 wherein:

said current source comprises a differential input amplifier and a first transistor having an input from said input amplifier;

said first impedance network comprises a first resistor;

said second impedance network comprises a sidetone balancing network in parallel with a second impedance element;

said third impedance network comprises a network of resistors and a capacitor and a second transistor responsive to a control input for changing the impedance of said third impedance network; and said first impedance element comprises a resistor.

18. Apparatus in accordance with claim 16 including:

a power supply comprising an inductor and a capacitor connected between said first line terminal and said common terminal; and a polarity guard connected between said first and second line terminals for maintaining a constant polarity across said network.

* * * * *